(12) United States Patent
Matias et al.

(10) Patent No.: US 12,033,668 B2
(45) Date of Patent: Jul. 9, 2024

(54) AGGREGATION OF RELATED MEDIA CONTENT

(71) Applicant: Google LLC, Mountain View, CA (US)

(72) Inventors: Yossi Matias, Tel-Aviv (IL); Matthew Sharifi, Kilchberg (CH); Thomas Bugnon, Zurich (CH); Dominik Roblek, Kilchberg (CH); Annie Chen, Thalwil (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/745,252

(22) Filed: May 16, 2022

(65) Prior Publication Data

US 2022/0277773 A1 Sep. 1, 2022

Related U.S. Application Data

(63) Continuation of application No. 17/009,934, filed on Sep. 2, 2020, now Pat. No. 11,335,380, which is a
(Continued)

(51) Int. Cl.
*G11B 27/031* (2006.01)
*G06F 16/44* (2019.01)
*G06V 20/40* (2022.01)
*G11B 27/034* (2006.01)
*G11B 27/10* (2006.01)
*G11B 27/28* (2006.01)
*G11B 27/30* (2006.01)
*H04N 23/698* (2023.01)
*H04N 5/04* (2006.01)

(52) U.S. Cl.
CPC .......... *G11B 27/031* (2013.01); *G06F 16/447* (2019.01); *G06V 20/41* (2022.01); *G11B 27/034* (2013.01); *G11B 27/10* (2013.01); *G11B 27/28* (2013.01); *G11B 27/3081* (2013.01); *H04N 23/698* (2023.01); *H04N 5/04* (2013.01)

(58) Field of Classification Search
CPC ..... G11B 27/031; G11B 27/034; G11B 27/10; G11B 27/28; G11B 27/3081; G06F 16/447; G06V 20/41; H04N 23/698
See application file for complete search history.

(56) References Cited

U.S. PATENT DOCUMENTS 7,373,650 B1  5/2008  Rodriguez et al.
7,433,329 B2  10/2008 Qian
(Continued)

OTHER PUBLICATIONS

Notice of Allowance dated Jan. 12, 2022 in U.S. Appl. No. 17/009,934.
(Continued)

*Primary Examiner* — Mishawn N. Hunter
(74) *Attorney, Agent, or Firm* — Shumaker & Sieffert, P.A.

(57) ABSTRACT

Systems and methods for media aggregation are disclosed herein. The system includes a media system that can transform media items into one aggregated media item. A synchronization component synchronizes media items with respect to time. The synchronized media items can be analyzed and transformed into an aggregated media item for storage and/or display. In one implementation, the aggregated media item is capable of being displayed in multiple ways to create an enhanced and customizable viewing and/or listening experience.

19 Claims, 10 Drawing Sheets

Related U.S. Application Data continuation of application No. 16/266,522, filed on Feb. 4, 2019, now Pat. No. 10,770,112, which is a continuation of application No. 14/842,506, filed on Sep. 1, 2015, now Pat. No. 10,199,069, which is a continuation of application No. 13/361,778, filed on Jan. 30, 2012, now Pat. No. 9,159,364.

(56) References Cited

U.S. PATENT DOCUMENTS

| | | |
|---|---|---|
| 7,460,730 B2 | 12/2008 | Pal et al. |
| 7,489,688 B2 | 2/2009 | Giesberts et al. |
| 7,583,288 B2 | 9/2009 | Uyttendaele et al. |
| 7,707,246 B1 | 4/2010 | Issa et al. |
| 7,752,265 B2 | 7/2010 | Svedsen et al. |
| 7,823,056 B1* | 10/2010 | Davey ............... G11B 27/34 715/202 |
| 7,978,931 B2 | 7/2011 | Pan et al. |
| 8,108,460 B2 | 1/2012 | Polis et al. |
| 8,122,080 B2 | 2/2012 | Polis et al. |
| 8,675,074 B2 | 3/2014 | Salgar et al. |
| 9,106,794 B2 | 8/2015 | Jones et al. |
| 9,159,364 B1 | 10/2015 | Matias et al. |
| 9,609,373 B2 | 3/2017 | Rango et al. |
| 10,199,069 B1 | 2/2019 | Matias et al. |
| 10,770,112 B2 | 9/2020 | Matias et al. |
| 11,335,380 B2 | 5/2022 | Matias et al. |
| 2002/0065678 A1 | 5/2002 | Peliotis et al. |
| 2002/0069218 A1 | 6/2002 | Sull et al. |
| 2004/0060061 A1 | 3/2004 | Parker |
| 2004/0126085 A1 | 7/2004 | Braun et al. |
| 2005/0008240 A1 | 1/2005 | Banerji et al. |
| 2007/0081796 A1 | 4/2007 | Fredlund et al. |
| 2007/0085908 A1* | 4/2007 | Honey ............... G02B 6/44528 348/157 |
| 2008/0036917 A1 | 2/2008 | Pascarella et al. |
| 2008/0060034 A1 | 3/2008 | Egnal et al. |
| 2008/0077262 A1 | 3/2008 | Davis et al. |
| 2009/0144237 A1 | 6/2009 | Branam et al. |
| 2009/0300520 A1 | 12/2009 | Ashutosh et al. |
| 2010/0017716 A1 | 1/2010 | Weda et al. |
| 2010/0104145 A1 | 4/2010 | Momosaki |
| 2010/0225811 A1 | 9/2010 | Konvisser |
| 2010/0281378 A1 | 11/2010 | Pendergast et al. |
| 2011/0249954 A1* | 10/2011 | Meek ............... H04N 7/147 386/239 |
| 2012/0039513 A1 | 2/2012 | Kennedy et al. |
| 2012/0077522 A1 | 3/2012 | Mate et al. |
| 2012/0198317 A1 | 8/2012 | Eppolito et al. |
| 2012/0219271 A1* | 8/2012 | Vunic ............... G06V 20/49 704/235 |
| 2012/0317598 A1 | 12/2012 | Gilson |
| 2013/0129232 A1 | 5/2013 | Cok et al. |
| 2013/0176438 A1 | 7/2013 | Mate et al. |
| 2014/0363141 A1* | 12/2014 | Bonhomme ......... G11B 27/031 386/278 |

OTHER PUBLICATIONS

Notice of Allowance dated May 1, 2020 in U.S. Appl. No. 16/266,522.
Notice of Allowance dated Jun. 18, 2015 in U.S. Appl. No. 13/361,778.
Notice of Allowance dated Sep. 18, 2018 in U.S. Appl. No. 14/842,506.
Office Action dated Jan. 21, 2020 in U.S. Appl. No. 16/266,522.
Office Action dated Mar. 27, 2014 in U.S. Appl. No. 13/361,778.
Office Action dated Apr. 9, 2015 in U.S. Appl. No. 13/361,778.
Office Action dated Apr. 13, 2017 in U.S. Appl. No. 14/842,506.
Office Action dated Jul. 6, 2021 in U.S. Appl. No. 17/009,934.
Office Action dated Jul. 26, 2019 in U.S. Appl. No. 16/266,522.
Office Action dated Jul. 27, 2017 in U.S. Appl. No. 14/842,506.
Office Action dated Aug. 2, 2016 in U.S. Appl. No. 14/842,506.
Office Action dated Sep. 5, 2014 in U.S. Appl. No. 13/361,778.
Office Action dated Nov. 15, 2017 in U.S. Appl. No. 14/842,506.
Office Action dated Dec. 19, 2014 in U.S. Appl. No. 13/361,778.
Prosecution History from U.S. Appl. No. 13/361,778, now issued U.S. Pat. No. 9,159,364, dated Mar. 27, 2014 through Jun. 18, 2015, 115 pp.
Prosecution History from U.S. Appl. No. 14/842,506, now issued U.S. Pat. No. 10,199,069, dated Aug. 2, 2016 through Sep. 18, 2018, 146 pp.
Prosecution History from U.S. Appl. No. 16/266,522, now issued U.S. Pat. No. 10,770,112, dated Jul. 26, 2019 through May 1, 2020, 73 pp.
Prosecution History from U.S. Appl. No. 17/009,934, now issued U.S. Pat. No. 11,335,380, dated Jul. 6, 2021 through Jan. 12, 2022, 23 pp.

* cited by examiner

AGGREGATION OF RELATED MEDIA CONTENT

CROSS-REFERENCE TO RELATED APPLICATIONS

This application is a continuation of U.S. patent application Ser. No. 17/009,934, filed Sep. 2, 2020, which is a continuation of U.S. patent application Ser. No. 16/266,522, filed Feb. 4, 2019, which is a continuation of U.S. patent application Ser. No. 14/842,506, filed Sep. 1, 2015, which is a continuation of U.S. patent application Ser. No. 13/361,778, filed Jan. 30, 2012, each of which is hereby incorporated by reference herein in its entirety.

TECHNICAL FIELD

This disclosure relates to aggregation of related media content, and more particularly to user controllable aggregation of media content for a particular event.

BACKGROUND

The proliferation, advancement, and affordability of image capturing devices such as smart phones, digital cameras, and other electronic devices has made media capturing easier and more available to the general public than ever before. Sharing of videos captured by individuals attending a particular sporting event, wedding, music concert or birthday party, etc. by way of a social media website has become commonplace. Videos of a same event are often uploaded by disparate people that attended the event. For example, querying an existing media sharing website for a video of an event, such as "rock star's concert in Berlin," can result in dozens if not hundreds of video files of that event. Respective videos of a common event are often recorded at different angles of view, different distance from the target of the video, different locations with respect to acoustic and/or lighting quality, different device capabilities (e.g., image capture quality, encoding, audio sensors, processing capabilities, etc.), and other differing aspects that manifest in the recorded video.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular implementations of the specification, or any scope of the claims. Its purpose is to present some concepts of the specification in a simplified form as a prelude to the more detailed description that is presented in this disclosure.

Systems and methods disclosed herein relate to aggregation of media content. In one non-limiting exemplary implementation, an identification component receives a media item and associates the media item with media items of the same event. A synchronization component synchronizes the media items based on a time correlation. Optionally, an analyzer component can be employed to analyze and rank the media items or segments of the media items, based on at least one criterion, e.g., video quality. An aggregation component then aggregates the synchronized and ranked portions of media items for aggregated playback. Optionally, an editor component can allow a user to modify and/or customize aggregation.

In another non-limiting example, a set video files are associated with each other. The video files, or portions of the files, are then synchronized based on time, then analyzed and ranked based on a metric (e.g., quality and/or user preference). The video files are aggregated according to rank. The aggregated files can be viewed by a user(s). The user(s) can seamlessly change between video files, audio files, and/or view multiple video or audio files at the same time.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, and advantages of the present invention will be apparent upon consideration of the following detailed description, taken in conjunction with the accompanying drawings, in which like reference characters refer to like parts throughout, and in which.

DETAILED DESCRIPTION

Figure 1:
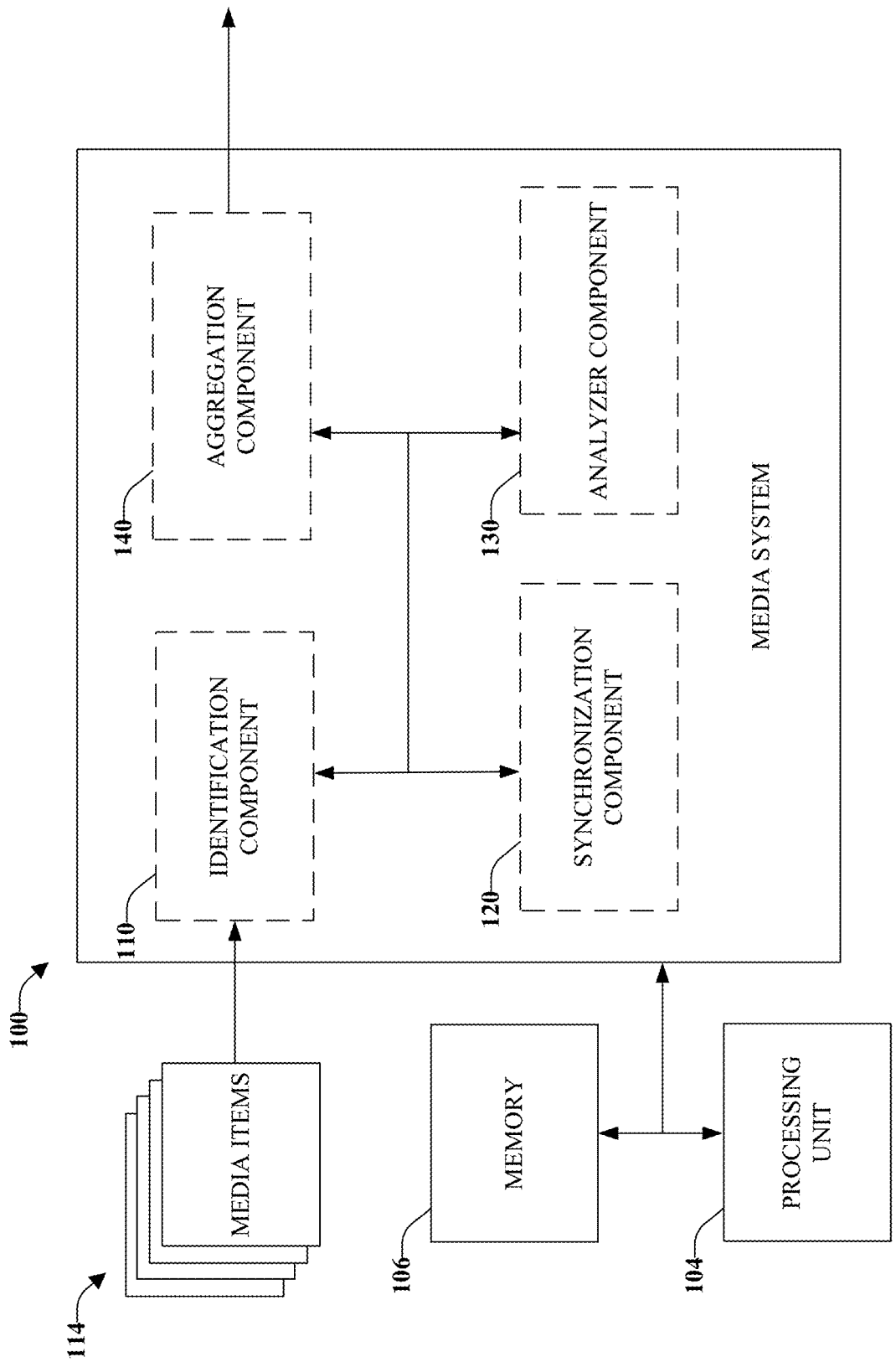
FIG. 1 illustrates a high-level functional block diagram of an example media system in accordance with various aspects of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing this disclosure.

Systems and methods disclosed herein relate to aggregation of media items. In one implementation, a media system is employed to aggregate a plurality of videos. Users capture and upload multiple video files of an event, such as for example a wedding, a school play, a children's sporting event, or the like (employing any of a variety of suitable video capture devices, e.g., video cameras, cell phones, tablets, smart phones, etc.). Respective video files are uploaded to a site for publication so that the user and others (e.g., friends, family members and other contacts) can access the video. The video files are uploaded in any suitable manner, e.g., directly from a recording device, using a personal computer, smart phone, or tablet.

In an embodiment, the video file(s) are stored on one or more servers. Each server may include various components that perform one or more respective functions such as analyzing the videos, acquiring features of the videos (e.g., determining the event that was recorded, a time of recording, the video's author, the type of recording device, the video's format, the event location, individuals within the video, angle of recording, the video's quality, the quality of associated audio, lighting, etc.), classifying the videos, associating the videos with similar videos (e.g., videos of the same event), and providing for aggregating subsets of the videos.

In one implementation, a component stored in a server determines that certain videos are related based on, for example, metadata or by analyses of the content of the videos. Metadata can include information related to time of capture, location of capture, and/or tags, for example. In one aspect, time and location information can be provided via a global positioning system (GPS) or communication network access points (e.g., internet connection access points). Time and location information associated with respective videos can determine a relationship between of the respective videos. Tags can be associated with each video by users or by automatic tagging techniques. Tagging refers to associating a key word, set of words or phrase with the video, wherein the associated key word(s) or phrases are referred to as a tag(s). For example, a user can tag a captured vide with "rock concert" "New York" "2000" "Rock Star".

In one embodiment, a subset of related videos is subsequently synchronized. The synchronization can be performed according to a common time line. For example, the time line can be determined through audio recognition, pattern recognition, captured time (e.g., time stamp), or a combination thereof. The videos can be analyzed in connection with various metrics or criteria (e.g., video quality, audio quality, angle of recording, level of noise, lighting, frequency of appearance of certain people or objects, etc.). For example, with respect to a set of videos associated with a particular school concert, a user may wish to focus on a particular child (the parent's own child) in the concert and input such criteria. Thus, a video can be aligned according to user relevance based in part on an affinity of a user to an individual or item viewable in the subset of the plurality of media items. Analyses of the set videos can determine (e.g., using facial recognition) image size and frequency of appearance of the child's face in respective videos of the set. In one implementation, videos (or segments thereof) within the set can be ranked based on a specified metric(s) (e.g., image size, and frequency of appearance of the child).

Subsets of portions of the respective videos can be aggregated to generate one or more files that emphasize desired aspects of the analyzed videos. The aggregated file(s) can display unique video in a variety of manners such as a single composite video, a mosaic of videos, a set of stitched videos for panoramic and/or 360 degree display. Furthermore, in one implementation, a user can choose to switch between videos for display. With reference to the above school concert example, the aggregated file can include seamless switching between a subset of the plurality of videos as a function of respective rank.

In an implementation, sound associated with each video can be combined or selectively chosen for playback. For example, analysis of audio information can determine highest quality audio associated with respective videos. Then, the selected audio can be played based on rank and/or combined with other audio. Audio of one video can be combined with an image portion of another video. Respective aggregated files can contain surround sound qualities through aggregation of multiple audio files.

Media items can be synchronized, analyzed, and aggregated according to audio quality, video quality, audio characteristics (e.g., focusing on bass, treble, amplitude, pitch, dB level, etc.), video features, or the like.

Referring now to FIG. 1, there is illustrated a non-limiting exemplary implementation of a media system 100 that provides media aggregation in accordance with various aspects of this disclosure. The system 100 provides for aggregation of media items that are captured, uploaded and/or viewed. The system 100 receives media item(s) 114 (e.g., audio and or video information) that are respectively captured and uploaded to the system 100 by a set of users. Respective users can capture and upload the media item(s) 114 via any suitable electronic device, such as for example a camera, smart phone, video camera, tablet computer, laptop computer, personal computer, cell phone and the like, via a communication framework, e.g., the Internet or cellular network. The media item(s) 114 can be provided to an identification component 110 at concurrent, overlapping or disparate times.

In FIG. 1, the system 100 includes a computer processing unit 104 capable of executing various components stored in a computer readable memory 106, such as an identification component 110, a synchronization component 120, an analyzer component 130, and an aggregation component 140. Memory 106 can store media item(s) 114. Identification component 110 associates a subset of the media items that pertain to a common event (e.g., a concert, a play, a sporting event, a speech) and/or a common person, object, subject, etc.). Identification component 110 can identify the common event through extrinsic information or analyses associated with respective media items (e.g., image or audio recognition, metadata comparison, tagging information, authors, location, time, content, etc.). In one example, metadata is generated automatically, such as via a global positioning system (GPS), or wireless location triangulation. In addition, time and location information can be generated by communication framework access points or routing information. For example, users can upload respective media items via a wireless router in a school auditorium and media identification component 110 can associate the respective media items with that location.

Synchronization component 120 synchronizes associated sets and/or subsets of media items. The associated media items are synchronized as a function of common characteristics (e.g., sound recognition, motion recognition, pattern recognition, time stamps, etc.). In one aspect, the media information synchronization is performed with respect to time. Synchronization component 120 can identify a common time line by comparing like characteristics in the set and/or subset of media item(s), metadata such as time stamps, or a combination thereof. In one example, motion and/or pattern recognition identifies common movements of a pattern in a plurality of video files to synchronize a set of media items. In another aspect, each frame of a video file can be synchronized with overlapping frames of other video items. In another example, key frames are selected for synchronization. In the event that audio information is contained in video files, synchronization can rely at least in part on correlation of the audio information. In an aspect, comparison of audio signals can be utilized to create a common time line for synchronization of associated video signals.

Analyzer component 130 analyzes a set of media items based on any of a variety of suitable metrics (e.g., quality of video, quality of audio, frequency of appearance of an individual or object, and angle of video or audio) that facilitate identifying portions of respective media items with desirable attributes. In one embodiment, analyzer component 130 groups a set of media items associated with a common event into one or more subsets of media items. Respective subsets of media items can be grouped based on any of a variety of suitable metrics.

In one example, analyzer component 130 ranks media items and groups the media items into respective subsets based on the rank (e.g., ranking and grouping as a function of video quality). In one aspect, analyzer component 130 segments media items into segments comprised of frames and analyzer component 130 analyzes each segment. Video quality analysis can include comparison of distortion, compression rates, variance in luminance and chrominance channels, comparison of noise, comparison of pattern frequency appearances and comparison of size. Video quality may be evaluated via video quality assessment (VQA) algorithms and techniques. Such techniques may include peak signal to noise ratio (PSNR), structural SIMilatary (SSIM), Multi-scale SSIM (MS-SSIM), Speed SSIM, and/or Visual Signal to Noise Ratio (VSNR).

Additionally and/or alternatively, video quality can be determined subjectively through user analysis. In one example, users can associate a quality with a video. The quality may be a level on a subjective scale such as number of stars or a number out of ten. In another example, video quality is subjectively determined based on multiple user input. Multiple user input may be an average ranking, a cumulative ranking (e.g., users may increase or decrease a quality by one), and/or a combination of the above.

Audio component quality associated with respective media items can vary. Audio component quality variation may be a result of several factors such as for example electronic equipment used in capturing audio, compression and decompression, orientation and distance from source audio, and/or background noise.

In one aspect, audio component quality can be analyzed via audio quality evaluation techniques. In one example, audio quality evaluation can be based on perceptual based audio quality methods (e.g., perceptual evaluation of audio quality (PEAQ), perceptual evaluation of speech quality (PESQ)), non-perceptual based audio quality methods (e.g., total harmonic distortion (THD), signal to noise ratio (SNR)), noise ratio (NR), spectral distortion (e.g., Bark spectral distortion), and/or comparison of parameters (e.g. loudness, amplitude modulation, adaption, masking parameters, linear distortion, bandwidth, and modular difference). In another example, at least one of psychoacoustic evaluation models or cognitive evaluation models can be employed to evaluate audio component quality.

In another example, audio quality can be determined through user's subjective analysis. For example, one or more users can associate a quality with an audio aspect of a media item.

In one implementation, analyzer component 130 uses pattern recognition techniques and/or systems to determine a rank associated with each media item of a set of media items 114. The analyzer component 130 can determine a frequency rate of a pattern (e.g., how often a pattern appears) in media items of the plurality of media items 114. Analyzer component 130 can associate a higher rank with media items of the plurality of media items 114 with higher frequencies.

Additionally or alternatively, pattern recognition techniques can identify a size of a pattern and/or identify partial patterns, e.g., only a portion of a total pattern is in an image frame. Moreover, a ranking can be determined based on the overall appearance and frequency of an identified pattern.

In another example, analyzer component 130 associates a rank with each media item of a set of media items according to a metric. For example, analyzer component 130 may analyze video quality of each media item of the set of media items 114 and analyzer component 130 may associate a rank with media items according to respective video quality. In one aspect, analyzer component 130 determines a respective location associated with media items based on a field. A location can be determined via user input or via image pattern recognition and/or motion recognition technology. Additionally, analyzer component may associate a rank with each media item of a set of media items based on the relative location.

In one aspect, each media item may not completely overlap with respect to time. Analyzer component 130 can divide media items into segments or clips. Segments of respective media items can be ranked with segments of other media items which temporally coincide.

In another aspect, analyzer component 130 can separate media items into separate components (e.g., audio component and video component). Respective components of media items can be analyzed. For example, audio components and video components of respective media items of a set of media items may be analyzed and ranked. In one example, corresponding audio and video components associated with the same media item can be given a rank independent of each other.

Aggregation component 140 transforms a set of media items into a composite aggregated media item. In one aspect, the composite aggregated media item can contain a set of synchronized and analyzed media items. In another example, a plurality of videos can relate to a common time such that the plurality of videos can be displayed simultaneously.

In on example, the composite aggregated media item can contain a subset of synchronized and analyzed media items such that only a select number of media items are aggregated. The subset can be determined based on analyzed metrics of the set of media items.

In one example, the composite media item can be a mosaic media item for storage and/or output. A mosaic aggregated media item may include a video array containing video segments associated with a plurality of media items such that, during playback, a plurality of video segments is concurrently displayed to create a mosaic display. In another aspect, a mosaic aggregated media item may include an audio array containing audio segments associated with a plurality of media items such that, during playback, a plurality of audio components is concurrently played to create surround sound qualities. Optionally, the audio signals are altered for appropriate playback (e.g., normalized and/or noise suppression).

In another example, a particular video segment of the mosaic media item can be focused on during playback while other video segments are blurred or partially displayed. Focus can be determined based on ranking, and/or user preference.

In another example, aggregation component 140 can create composite aggregated media item that is rotatable. For example, media items can be stitched to create a panoramic media item. The panoramic media item can comprise media items stitched according to relative location. The panoramic media item can be rotatable such that one or more video segments can be displayed and then one or more different video segments can be displayed. Display can change based on ranking, user input, positional information, and/or periodically (e.g., change every five seconds).

In one aspect, aggregation component 140 can implement techniques to calibrate video channel levels (e.g., brightness, color, gamma) of each media item of the plurality of media item(s) 114 such that video items contain similar levels. For example, media items can each contain a distinct level of brightness. An ideal brightness can be selected, (e.g., brightness can be averaged, highest level of brightness, a range of brightness) and each media item can be adjusted, amplified or de-amplified, to an appropriate level.

In another example, aggregation component 140 can implement techniques to calibrate audio levels of each media item of the plurality of media item(s) 114 such that audio files contain similar levels. For example, media items can contain various volumes of audio. An ideal volume can be selected, (e.g., volumes can be averaged, loudest volume, a range of volumes) and respective audio components are adjusted, amplified and/or de-amplified to an appropriate level. Calibration can be automated, such as implemented by a processor running computer executable instructions, can be manual, or can be implemented as a combination of automated and manual calibration.

Figure 2:
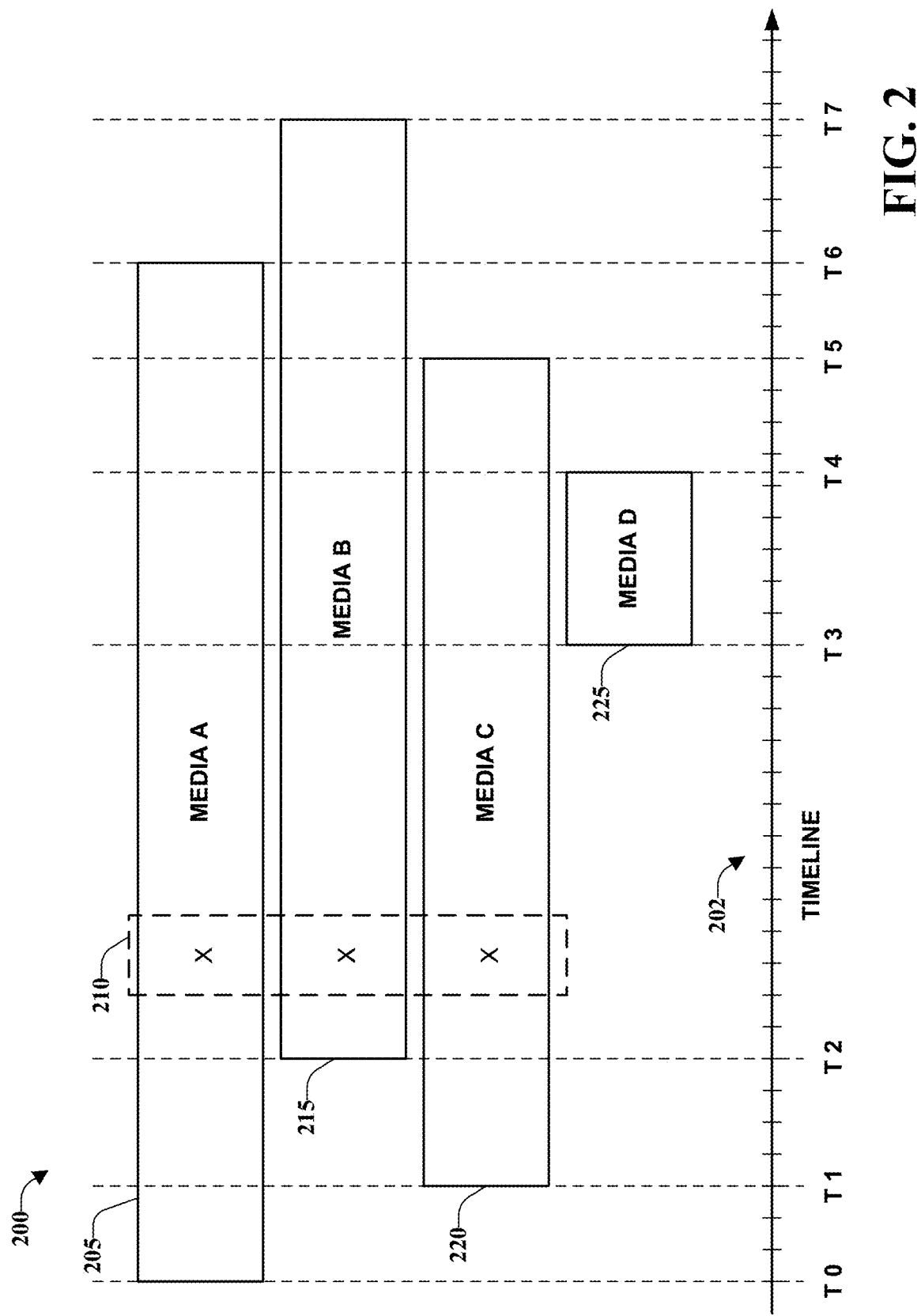
FIG. 2 illustrates an exemplary synchronization of media items in accordance with various aspects of this disclosure.

Turning to FIG. 2, with reference to FIG. 1, a graphical depiction 200 of media items synchronized on a common timeline 202 is provided. In FIG. 2, four different user captured video items (media items A, B, C, and D (205, 215, 220, 225)) are shown. The media items pertain to a common event. Each respective video item can be taken over same, different, or overlapping time periods. Each respective video item may be taken using different types of devices, e.g., different consumer electronic devices. For example, video items may be taken using a mobile phone by one user, a point-and-shoot digital camera by another user, and a different portable device by another user. While only four different media items are shown for illustrative purposes, a different number media items could be depicted instead.

In one example, analyzer component 130 selects media items A, B, C, and D (205, 215, 220, 225) as a subset of media items from a set of media items 114 identified by identification component 110. The set of media items can represent media items with a desired feature (e.g., each media item contains a common image pattern or is a desired quality).

Synchronization component 120 can identify the common feature(s) 210 of media items A, B and C (205, 215, 220). In one aspect, the common feature(s) may be recognized via image recognition, motion recognition, and/or audio recognition. Additional feature(s) can be identified between at least two media items of the set of media items A-D. In one aspect, synchronization component 120 can synchronize media items one or more times. In one example, media items A, B, C, and D (205, 215, 220, 225) may be synchronized according to identified key frames, frame by frame, randomly, and/or periodically.

Synchronization component 120 identifies or defines a common timeline 202. The common timeline 202 can have associated start and end times for each media item A, B, C, and D (205, 215, 220, 225). FIG. 2 depicts media items with the following time associations: media item A (205) begins at a time T0 and lasts until T6; media item B (215) begins at time T2 and lasts until T7; media item C (220) begins at T1 and lasts until T5; and media item D (225) begins at T3 and lasts until T4.

In one aspect, analyzer component 130 associates a rank with each media item of the set of media items A, B, C, and D (205, 215, 220, 225). In another aspect, analyzer component splits each media item of the set of media items A, B, C, and D (205, 215, 220, 225) into one or more clips. Clips can be various lengths. In one example, analyzer component 130 determines clip lengths according to start and end times of each media item of the set of media items A, B, C, and D (205, 215, 220, 225). In this aspect, media item A (205) is divided into six clips (T0 to T1, T1 to T2, T2 to T3, T3 to T4, T4 to T5, T5 to T6) and the remaining media items are similarly divided.

Analyzer component 130 can rank respective clips of media items on a temporal basis. For example, analyzer component 130 can rank respective clips of media item A (205) and C (220) associated with the period T1 to T2. In addition, analyzer component can rank respective clips of media item A (205), B (215) and C (220) associated with period T2 to T3. In an implementation, analyzer component can store ranks of respective clips in an array.

Aggregation component 140 can aggregate the set of media items A, B, C, and D (205, 215, 220, 225) into one or more aggregated media items. For example, aggregation component 140 can aggregate media items A, B, C, and D (205, 215, 220, 225) as a function of rank. In one example, media items with a higher rank are displayed or identified as a focal point.

Figure 3:
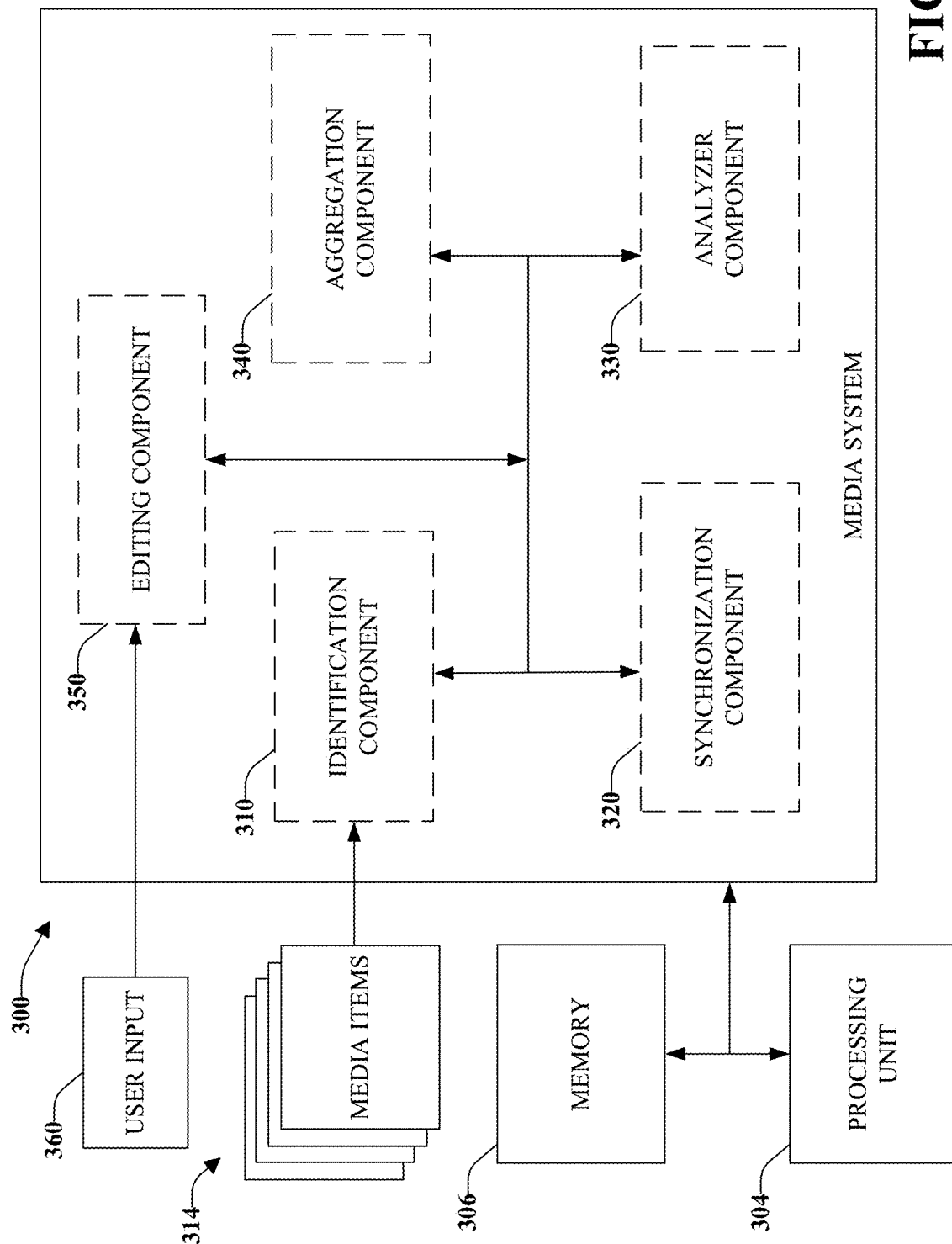
FIG. 3 illustrates a high-level functional block diagram of an example media system including an editing component in accordance with various aspects of this disclosure.

Referring to FIG. 3, there is illustrated a non-limiting exemplary implementation of media system 300 that provides media item aggregation according to an aspect of this disclosure. Media system 300 includes a computer processing unit 304 capable of executing various components stored in a computer readable memory 306, such as an identification component 310, a synchronization component 320, an analyzer 330, an aggregation component 340, and an editing component 350. Identification component 310 collects media items and associates media items of common events. Synchronization component 320 synchronizes media items with respect to time. Analyzer component 330 analyzes aspects of media items and can rank media items, or clips of media items. Aggregation component 340 aggregates the analyzed and synchronized media items into a composite media item.

In one implementation, editing component 350 modifies analysis and ranking by analyzer component 330 and aggregation by aggregation component 340, e.g., based on user input 360. In one example, user input 360 can customize analysis to place a higher importance on frequency of an image pattern, e.g., place higher importance on recognition of a particular face in a set of media items. User input 360 can be information input by at least one user and system 300 can receive and/or save user input 360.

In another example, editing component 350 can enable modification of ranking and aggregation according to arbitrary user input 360. For example, a user may prefer a particular view and/or may prefer transition or panning to a different view based on personal preference and not a measurable metric.

Figure 4:
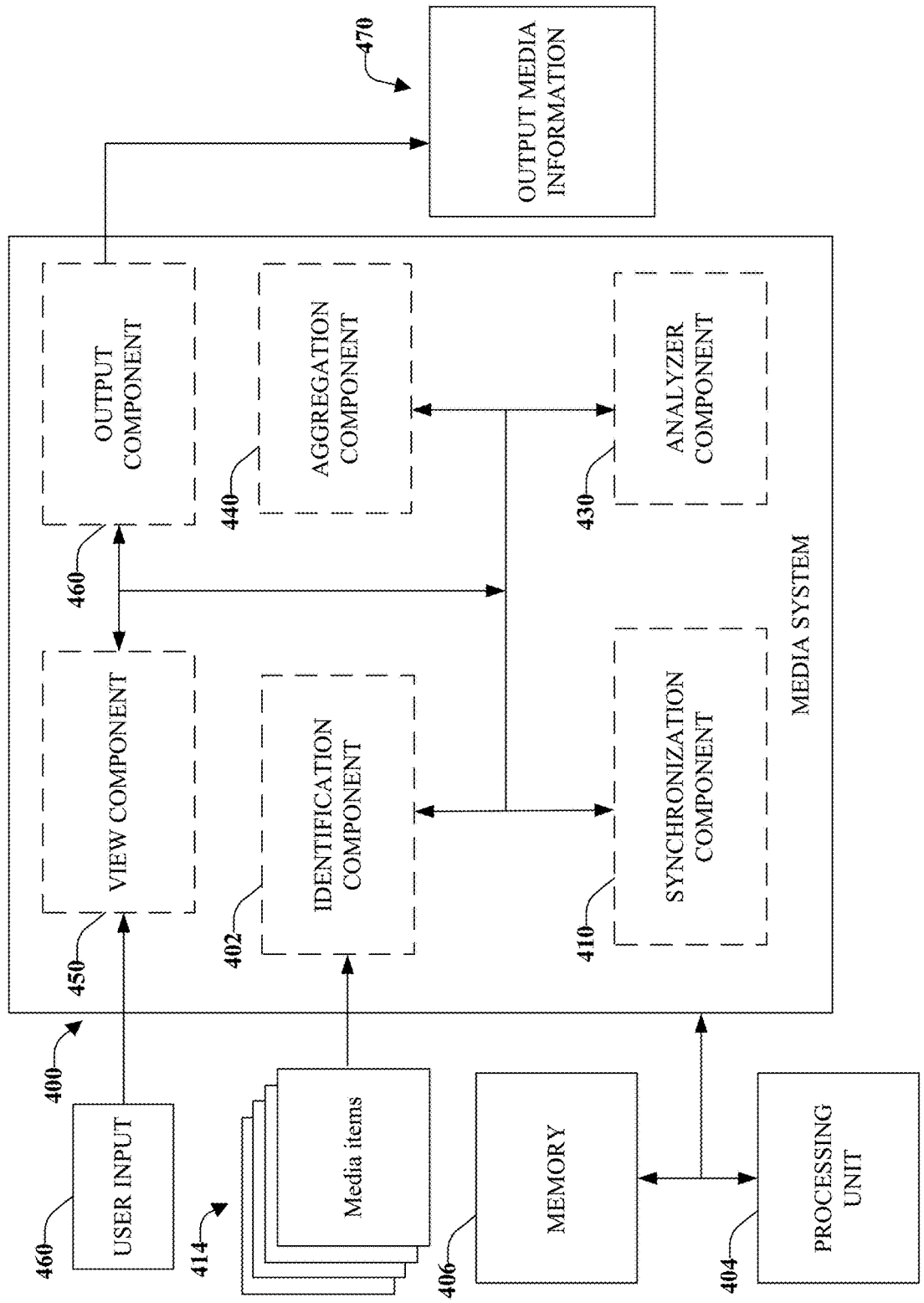
FIG. 4 illustrates a high-level functional block diagram of an example media system including a view component in accordance with various aspects of this disclosure.

Turning now to FIG. 4, there is illustrated a non-limiting exemplary implementation of a media system 400 that provides media aggregation, according to an aspect of this disclosure. Media system 400 includes a computer processing unit 404 capable of executing various components stored in a computer readable memory 406, such as an identification component 402, a synchronization component 410, an analyzer 430, an aggregation component 440, a view component 450, and an output component 460. Identification component 402 receives media items 414 and associate media items 414 into sets of media items pertaining to respective common events. Synchronization component 410 synchronizes media items with respect to time. Analyzer component 430 analyzes and ranks media according to at least one metric. Aggregation component 440 transforms a set of media items to at least one aggregated media item.

In FIG. 4, output component 460 is capable of outputting output media items 470 (e.g., a composite aggregated media item). In one aspect, outputting a media item can include uploading, storing in memory, broadcasting, displaying and/or streaming. In an example, output component 460 outputs a mosaic media item or a panoramic media item.

Figure 5:
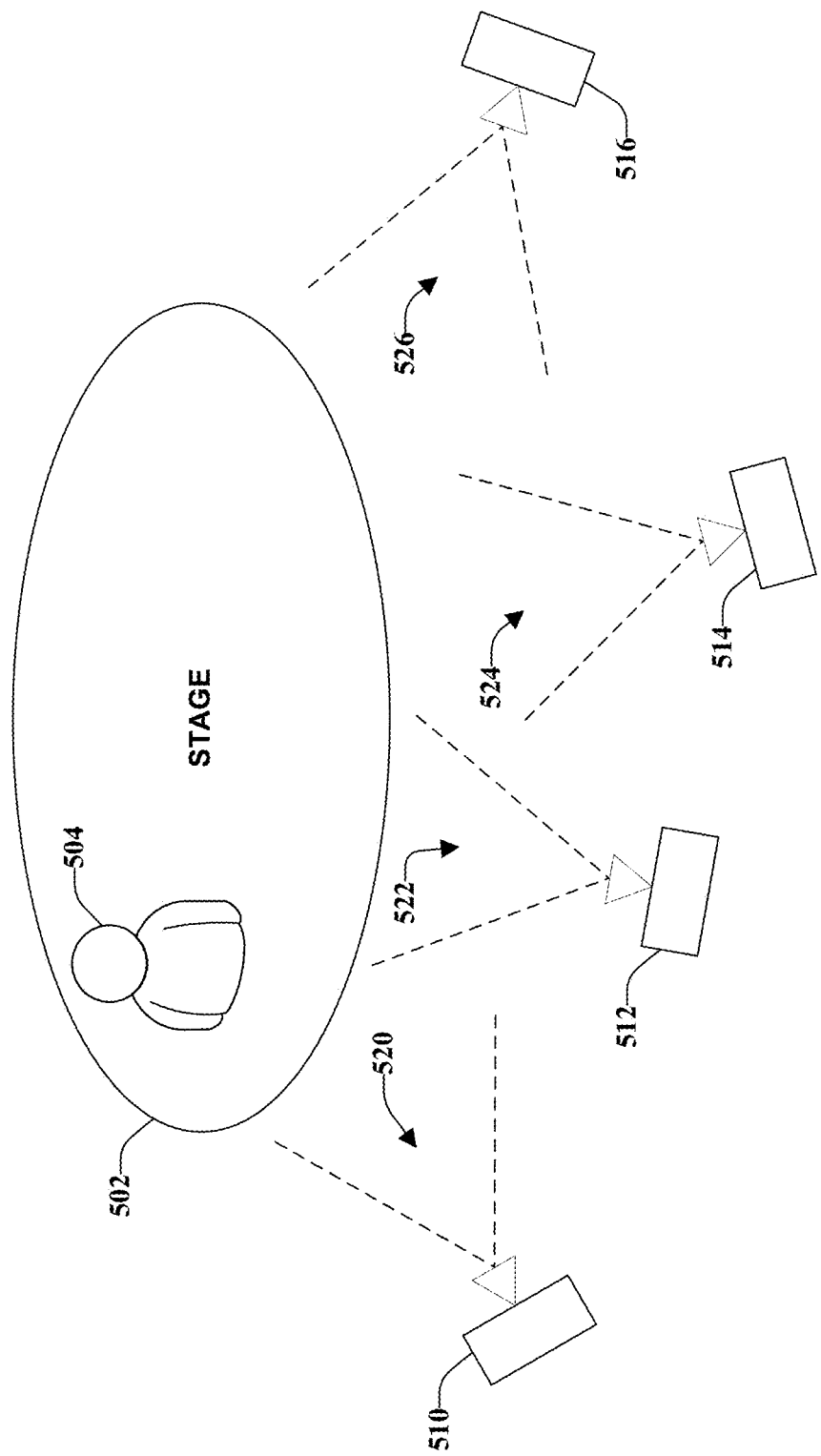
FIG. 5 illustrates an example diagram of a real world event in accordance with various aspects of this disclosure.

Referring now to FIG. 5 with reference to FIG. 4, there is illustrated a diagram of an event in accordance with various aspects of this disclosure. In FIG. 5, the event is a school concert where there is a stage 502 and a student performer 504 on the stage 502. A plurality of electronic devices (510, 512, 514, 516) captures media items of the event. Each media item captured by the electronic devices (510, 512, 514, 516) has an associated field of view (520, 522, 524, 526, respectively). In one example, media items captured by the plurality of electronic devices (510, 512, 514, 516) vary in audio quality, video quality, angle, and capture content (e.g., focus on different areas of stage 502). In use, each electronic capture device may be owned by a different user (e.g., a different parent of students in the school concert) and each user may upload the media item captured by his/her device to a user generated content (UCG) hosting site. In one implementation, view component 450 provides for panning between fields of view of respective media items. For example, view component 450 may allow for output media information 460 to display the field of view 520 and enable a user to pan to view 526 by transitioning to view 522, 524 and then 526. In one implementation, the output component 460 displays more than one segment of a set of media items simultaneously.

Figure 6:
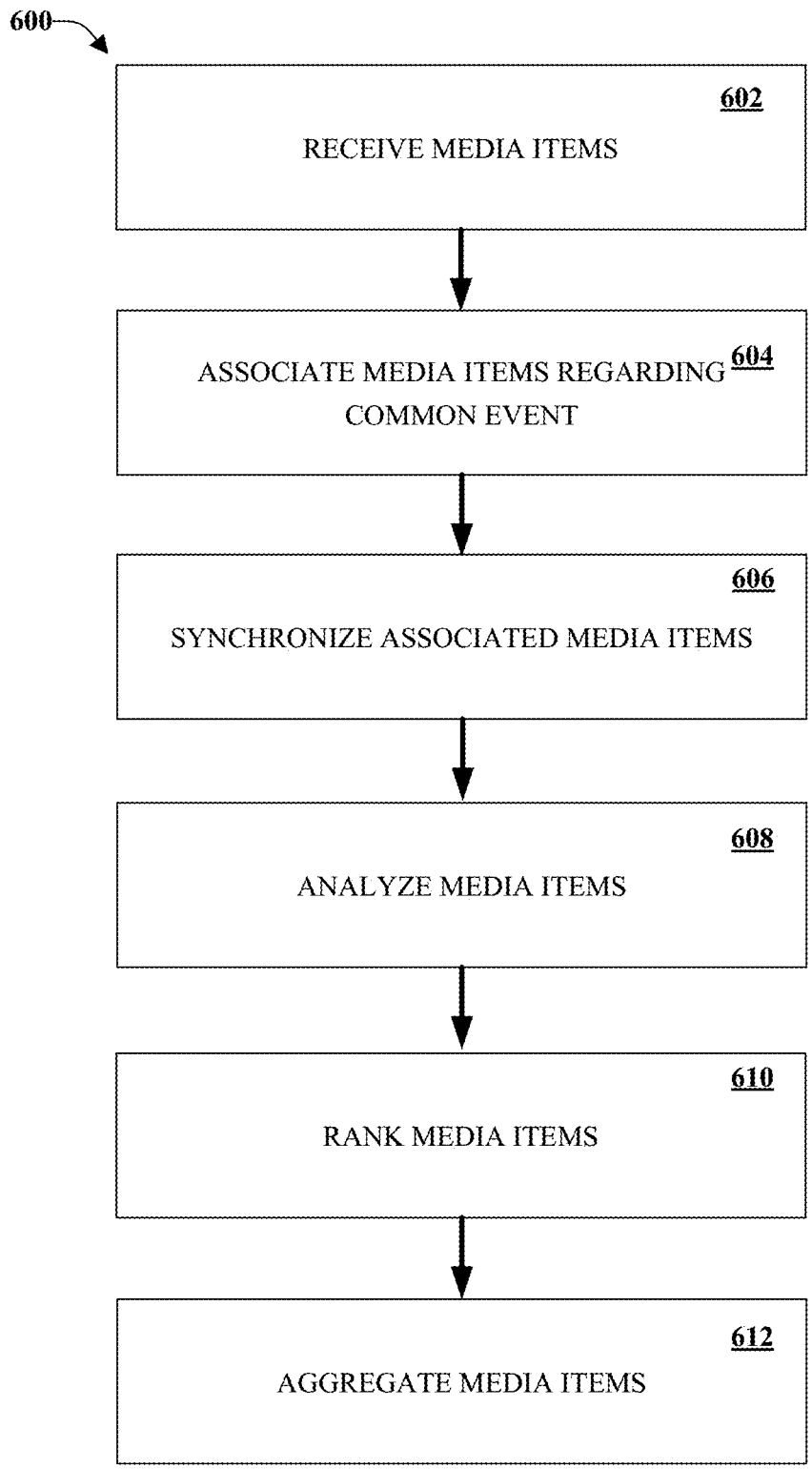
FIG. 6 illustrates an example methodology for aggregating media items in accordance with various aspects of this disclosure.
Figure 7:
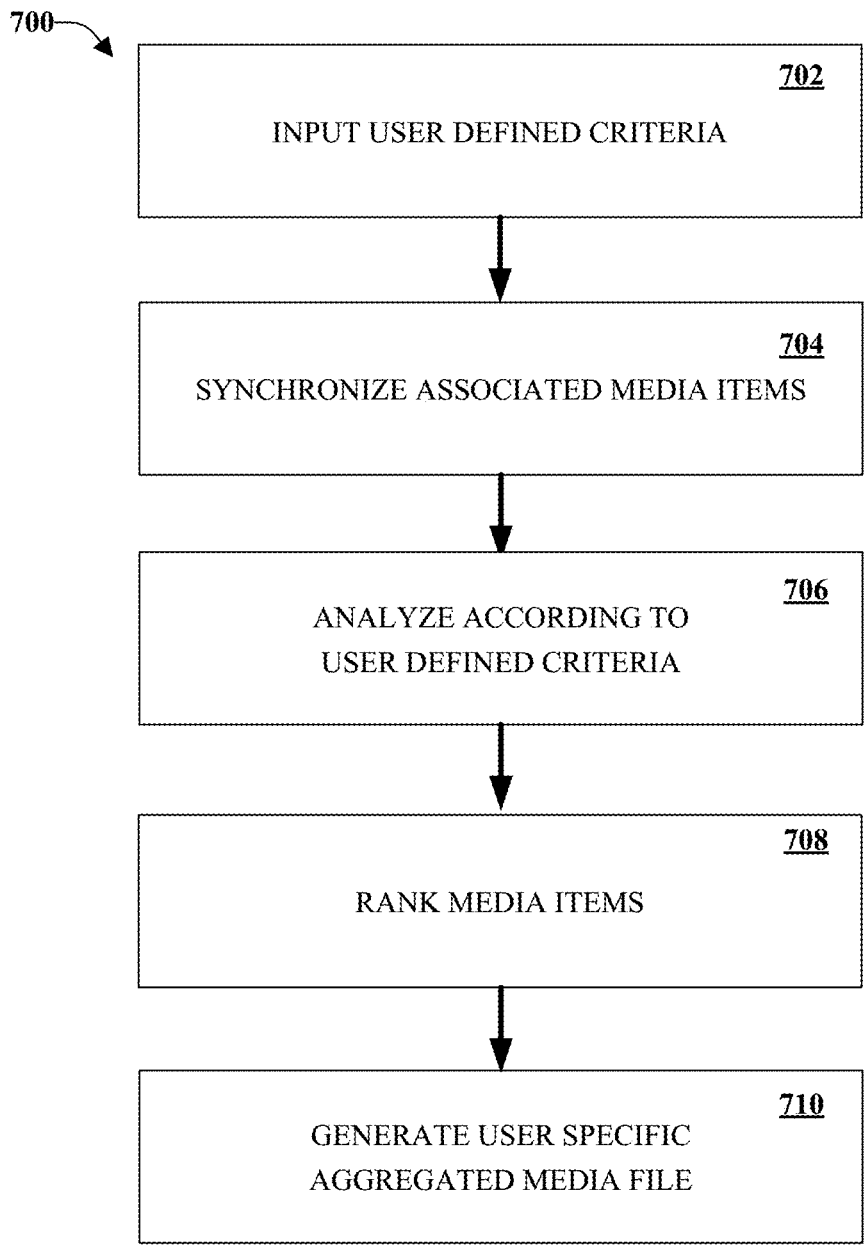
FIG. 7 illustrates an example methodology for aggregating media items according to user input in accordance with various aspects of this disclosure.
Figure 8:
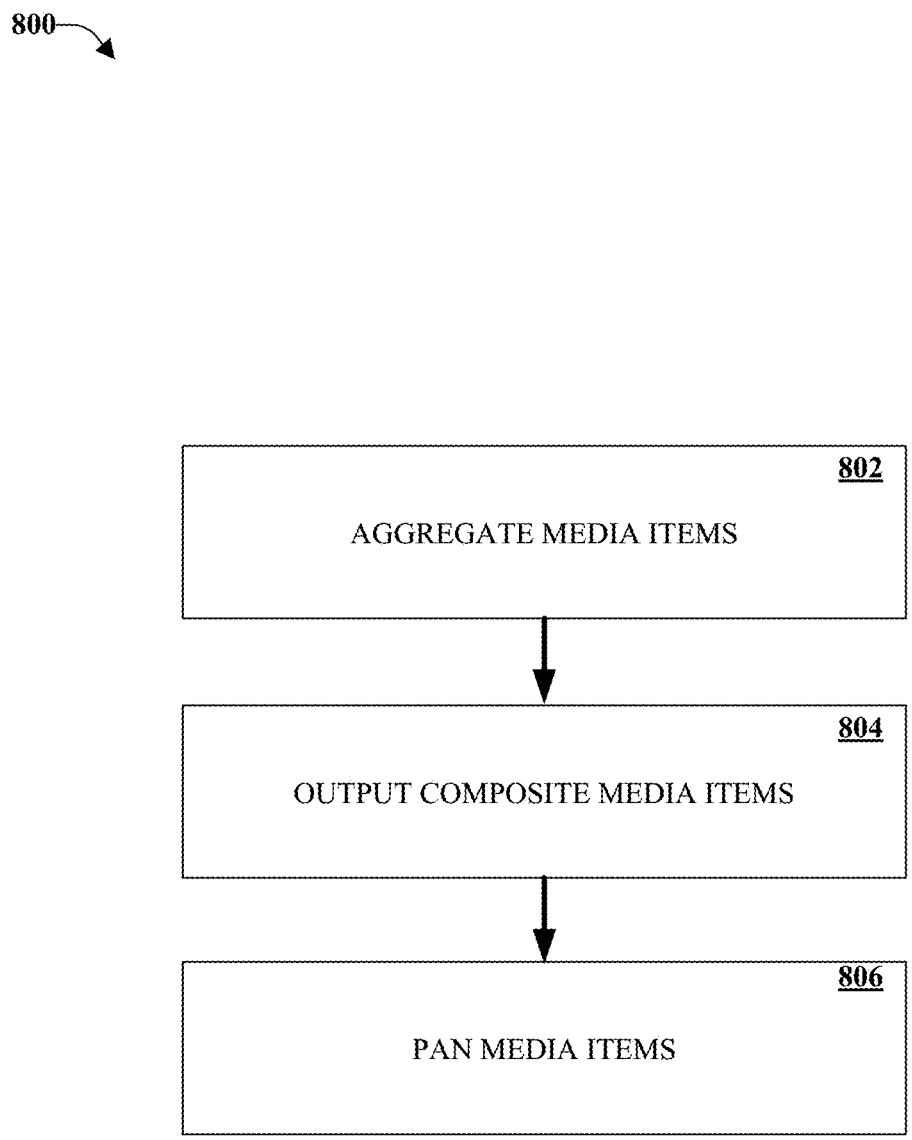
FIG. 8 illustrates an example methodology for aggregating media items and displaying media items in panoramic format in accordance with various aspects of this disclosure.

Referring now to FIGS. 6-8, there are illustrated methodologies and/or flow diagrams in accordance with the disclosed subject matter. For simplicity of explanation, the methodologies are depicted and described as a series of acts. However, acts in accordance with this disclosure can occur in various orders and/or concurrently, and with other acts not presented and described herein. For example, synchronization can occur before analysis and/or multiple synchronizations can occur. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer readable device or storage medium.

With reference to FIG. 6, there is illustrated a methodology 600 for aggregating media information, according to an aspect of this disclosure. As an example, various media applications, such as, but not limited to, media capturing systems, social networking systems, and user generated content (UGC) systems, can use methodology 600. Specifically, methodology 600 transforms multiple media items into a single aggregated media item.

Media items can be collected (e.g., by an identification component) at 602. For example, media items can be stored in a computer readable memory (e.g., memory 104). The memory can be volatile or nonvolatile memory, for example. At 604, media items are associated with other media items (e.g., by an identification component). For example, media items pertaining to a common event can be associated by a media system.

At 606, media items are analyzed (e.g., by an analyzer component). Analyzing media items may include media quality determination, image or audio signal recognition, ranking of media items, division of media items into segments, and configuration of media levels (e.g., sound configuration, image configuration) for example.

At 608, media items are synchronized (by a synchronization component). In one aspect, media items are synchronized with respect to time. Synchronization may be based on identifiable aspects of media information such as common audio or video characteristics. Additionally or alternatively, synchronization may be based on metadata such as time stamps.

At 610, media items can be ranked (by an analyzer component). Ranking can comprise associating a unique rank with each media item according to analyzed metrics and/or features. In one aspect, respective media item clips corresponding to identical time periods are ranked relative to each other. Ranking can rely on comparison of associated audio quality, video quality, frequency rate of an identified patter, and/or field of view.

Turning to 612, media items are transformed into one or more aggregated media item (e.g., by an aggregation component). The aggregated media item can comprise multiple video items capable of being simultaneously displayed in a mosaic, panoramic and/or 360 degree display.

Referring to FIG. 7 there illustrated is a methodology 700 for user specific media item aggregation according to an aspect of this disclosure. As an example, methodology 700 can be utilized in various web applications, media capturing systems, media displaying systems, computing devices, cellular phones, etc. Specifically, methodology 700 enables utilization of user defined criteria to provide for aggregate media files of a common event which most interest a user.

Initially, media items can be captured or can be contained within memory. Media items may be video with accompanying audio. At 702, a user can define criteria for aggregation (e.g., via an editor component 350). Criteria for aggregation can be related to identifiable characteristics of media items such as frequency of an image in frames, video quality, audio quality, image characteristics, video characteristics (motion, brightness, color), and/or sound characteristics (e.g., bass, treble, noise), for example.

At 704, a set of media items is synchronized with respect to time (e.g., by a synchronization component 320) At 706, media items are analyzed according to the user defined criteria (e.g., by an analyzer component 330). Media items can be grouped into sets according to the analyzed criteria. For example, media items that contain a common image pattern can be grouped into a set (e.g., media items containing a recognized face can be grouped into a set).

At 708, each media item of a set of media items are ranked according to a user relevance determined by the user defined criteria (e.g., by a analyzer component 330). For example, a user may select video quality as the most important attribute for ranking Thus, media items with higher associated video quality will have a higher rank. At 710 sets of media items are transformed into one or more aggregated media items (e.g., by an aggregation component 340). In one aspect, the aggregated media item contains each media item of the set of media items. In another aspect, the aggregated media item contains a subset of the set of media items.

FIG. 8 illustrates an example methodology 800 for media item aggregation and display in accordance with an aspect of this disclosure. Initially a plurality of media items is analyzed, synchronized, and ranked (e.g., by an analyzer component). At 802, an aggregation component, for example, can aggregate media items with respect to a rank. In another example, media items can be aggregated with respect to an associated field of view as compared to other media items to generate a composite media item.

At 804, a composite media item is output (e.g., by an output component). Outputting the composite media items can include saving in a computer readable memory, streaming, uploading, downloading, broadcasting and/or displaying the composite media item (e.g., by an output component). For example, the outputted composite media items may be displayed, e.g., via a communications framework (e.g., the internet, cellular networks, Ethernet and/or wireless networks) in communication with a display screen.

At 806, the composite media item can switch between views. For example, an editing component can receive user input to pan through views of the composite media item. A view component can switch the view of the composite media item based on the received input and an output component can display the changed view.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

Figure 9:
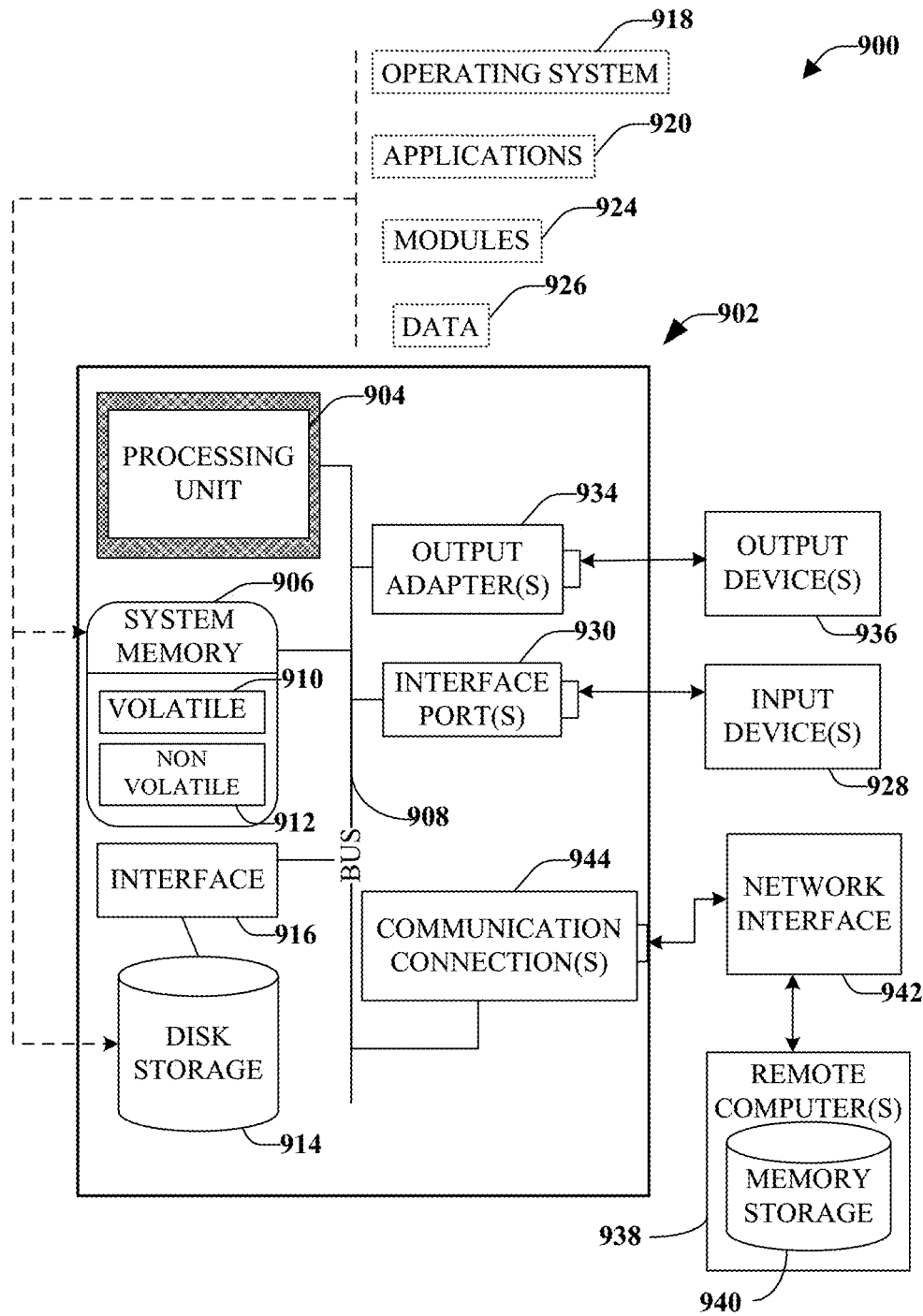
FIG. 9 illustrates an example schematic block diagram of a computing environment in accordance with various aspects of this disclosure.

With reference to FIG. 9, a suitable environment 900 for implementing various aspects of the claimed subject matter includes a computer 902. The computer 902 includes a processing unit 904, a system memory 906, a codec 905, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 906 includes volatile memory 910 and non-volatile memory 912. The basic input/output system (BIOS), containing the basic routines to transfer information between elements within the computer 902, such as during start-up, is stored in non-volatile memory 912. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 902 may also include removable/non-removable, volatile/non-volatile computer storage media. FIG. 9 illustrates, for example, a disk storage 914. Disk storage 914 includes, but is not limited to, devices like a magnetic disk drive, solid state disk (SSD) floppy disk drive, tape drive, Zip drive, LS-100 drive, flash memory card, or memory stick. In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902, and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN), wide-area networks (WAN), and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, wired and wireless Ethernet cards, hubs, and routers.

Figure 10:
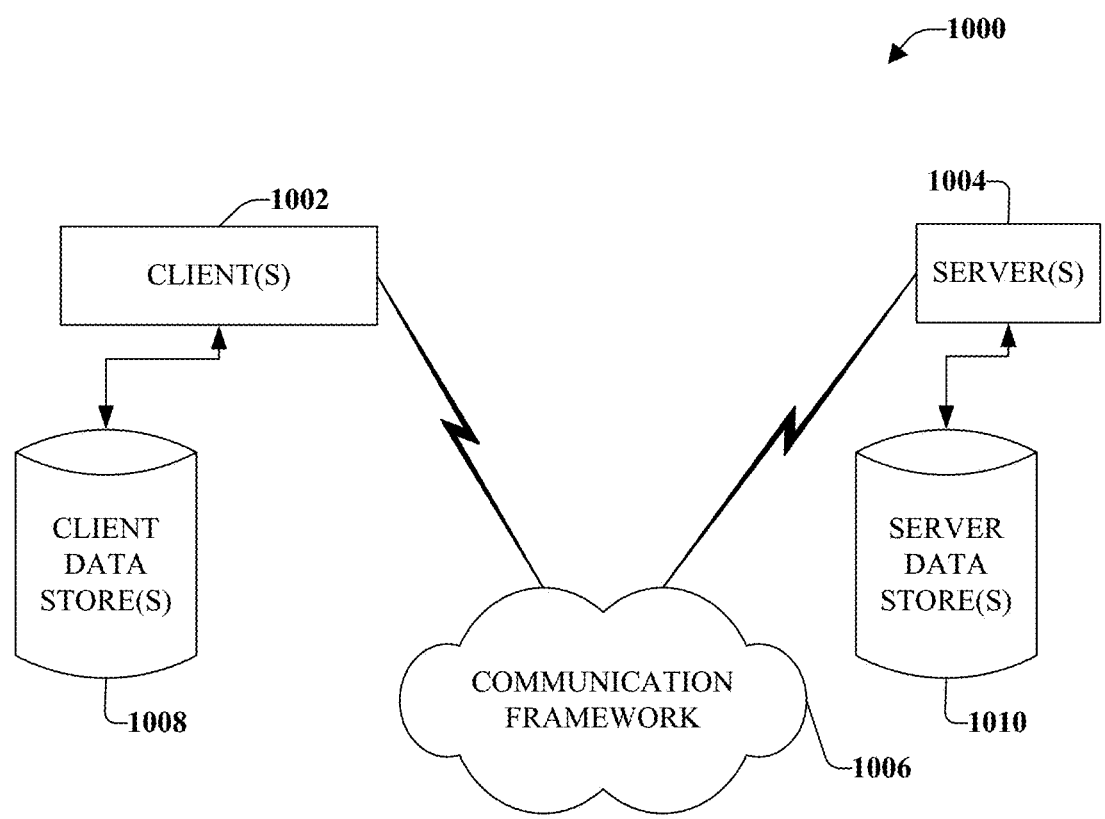
FIG. 10 illustrates an example block diagram of a computer operable to execute various aspects of this disclosure.

Referring now to FIG. 10, there is illustrated a schematic block diagram of a computing environment 1000. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations by employing aspects of this disclosure (e.g., analyzing videos, aggregating videos, and/or storing video information). One possible communication between a client 1002 and a server 1004 can be in the form of a data packet adapted to be transmitted between two or more computer processes wherein data packets may include coded media items. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one implementation, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the implementations of this innovation(s). Furthermore, it can be appreciated that many of the various components can be implemented on one or more integrated circuit (IC) chips. For example, in one implementation, a set of components can be implemented in a single IC chip. In other implementations, one or more of respective components are fabricated or implemented on separate IC chips.

What has been described above includes examples of the implementations of the present invention. It is, of course, not possible to describe every conceivable combination of components or methodologies for purposes of describing the claimed subject matter, but it is to be appreciated that many further combinations and permutations of this innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the illustrated exemplary aspects of the claimed subject matter (e.g., media item analysis, synchronization, and aggregation). In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than or equal to 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In addition, while a particular feature of this innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Reference throughout this specification to "one implementation" or "an implementation" or "one embodiment" or "an embodiment" means that a particular feature, structure, or characteristic described in connection with the implementation is included in at least one implementation or at least one embodiment. Thus, the appearances of the phrase "in one implementation" or "in an implementation" or "in one embodiment" or "in an embodiment" in various places throughout this specification are not necessarily all referring to the same implementation/embodiment. Furthermore, the particular features, structures, or characteristics may be combined in any suitable manner in one or more implementations/embodiments.

Further, references throughout this specification to an "item," or "file," means that a particular structure, feature or object described in connection with the implementations are not necessarily referring to the same object. Furthermore, a "file" or "item" can refer to an object of various formats. While referees to media items generally refer to video items (a series of image files with or without audio), it is to be appreciated that media items may be of various formats.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. While separate components are depicted in various implementations, it is to be appreciated that the components may be represented in one or more common component. Further, design of the various implementations can include different component placements, component selections, etc., to achieve an optimal performance. Further, a "device" can come in the form of specially designed hardware; generalized hardware made specialized by the execution of software thereon that enables the hardware to perform specific function (e.g., media item aggregation); software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A media system, comprising:
 a processor that:
  receives a first video item captured by a first user device and a second video item captured by a second user device;
  determines, based on the first video item and the second video item, a pattern common to the first video item and the second video item;
  aggregates the first video item and the second video item into a composite video item that includes at least a first segment from the first video item and a second segment from the second video item based at least on first metadata associated with the first video item and second metadata associated with the second video item, wherein the composite video item is a mosaic in which the first video item and the second video item are concurrently displayed and wherein the first video item and the second item in the mosaic are synchronized on a common timeline based on the determined pattern; and
  causes the composite video item to be presented on a third user device in which the first video item and the second video item are simultaneously played back within the mosaic.

2. The system of claim 1, wherein the processor further:
 receives a third video item from a fourth user device; and
 generates a second composite video item that includes at least the second segment from the second video item and a third segment from the third video item, wherein the second composite video item is a mosaic in which the second video item and the third video item are concurrently displayed.

3. The system of claim 2, wherein the first video item and the third video item are ranked.

4. The system of claim 1, wherein aggregating the first video item and the second video item into a composite video item comprises including audio content associated with the first video item in the composite video item and inhibiting inclusion of audio content associated with the second video item in the composite video item.

5. The system of claim 1, wherein the processor further modifies presentation of the composite video item on the third user device by modifying a visual characteristic with which the first video item is presented within the mosaic.

6. The system of claim 5, wherein modifying the visual characteristic is based on a user preference indicated by a user of the first user device.

7. The system of claim 5, wherein modifying presentation of the composite video item comprises changing a view of the composite video item.

8. The system of claim 1, wherein the processor further determines that the first video item captured by the first user device and the second video item captured by the second user device are associated with each other based at least on the first metadata associated with the first video item and the second metadata associated with the second video item.

9. The system of claim 8, wherein the first video item and the second video item are aggregated into a composite video item that includes at least a first segment from the first video item and a second segment from the second video item based on determining that the first video item captured by the first user device and the second video item captured by the second user device are associated with each other.

10. A method comprising:
receiving, using a hardware processor, a first video item captured by a first user device and a second video item captured by a second user device;
determining, based on the first video item and the second video item, a pattern common to the first video item and the second video item;
aggregating, using the hardware processor, the first video item and the second video item into a composite video item that includes at least a first segment from the first video item and a second segment from the second video item based at least on first metadata associated with the first video item and second metadata associated with the second video item, wherein the composite video item is a mosaic in which the first video item and the second video item are concurrently displayed and wherein the first video item and the second item in the mosaic are synchronized on a common timeline based on the determined pattern; and
causing, using the hardware processor, the composite video item to be presented on a third user device in which the first video item and the second video item are simultaneously played back within the mosaic.

11. The method of claim 10, further comprising:
receiving a third video item from a fourth user device; and
generating a second composite video item that includes at least the second segment from the second video item and a third segment from the third video item, wherein the second composite video item is a mosaic in which the second video item and the third video item are concurrently displayed.

12. The method of claim 11, wherein the first video item and the third video item are ranked.

13. The method of claim 10, wherein aggregating the first video item and the second video item into a composite video item comprises including audio content associated with the first video item in the composite video item and inhibiting inclusion of audio content associated with the second video item in the composite video item.

14. The method of claim 10, further comprising modifying presentation of the composite video item on the third user device by modifying a visual characteristic with which the first video item is presented within the mosaic.

15. The method of claim 14, wherein modifying the visual characteristic is based on a user preference indicated by a user of the first user device.

16. The method of claim 14, wherein modifying presentation of the composite video item comprises changing a view of the composite video item.

17. The method of claim 10, further comprising determining that the first video item captured by the first user device and the second video item captured by the second user device are associated with each other based at least on the first metadata associated with the first video item and the second metadata associated with the second video item.

18. The method of claim 17, wherein the first video item and the second video item are aggregated into a composite video item that includes at least a first segment from the first video item and a second segment from the second video item based on determining that the first video item captured by the first user device and the second video item captured by the second user device are associated with each other.

19. A non-transitory computer-readable medium containing computer executable instructions that, when executed, cause a hardware processor to:
receive a first video item captured by a first user device and a second video item captured by a second user device;
determine, based on the first video item and the second video item, a pattern common to the first video item and the second video item;
aggregate the first video item and the second video item into a composite video item that includes at least a first segment from the first video item and a second segment from the second video item based at least on first metadata associated with the first video item and second metadata associated with the second video item, wherein the composite video item is a mosaic in which the first video item and the second video item are concurrently displayed and wherein the first video item and the second item in the mosaic are synchronized on a common timeline based on the determined pattern; and
cause the composite video item to be presented on a third user device in which the first video item and the second video item are simultaneously played back within the mosaic.

* * * * *